Aug. 18, 1925.

S. R. LINES 1,550,374

ELECTRICALLY ILLUMINATED SIGN

Filed Aug. 14, 1924     6 Sheets-Sheet 1

INVENTOR
Sydney Robert Lines
By Emil Bonnelycke
ATTORNEY

Aug. 18, 1925.

S. R. LINES 1,550,374

ELECTRICALLY ILLUMINATED SIGN

Filed Aug. 14, 1924   6 Sheets-Sheet 2

INVENTOR
Sydney Robert Lines
By Emil Bönnelycke
ATTORNEY

Aug. 18, 1925.

S. R. LINES 1,550,374

ELECTRICALLY ILLUMINATED SIGN

Filed Aug. 14, 1924  6 Sheets-Sheet 4

INVENTOR
Sydney Robert Lines
By Emil Bönnelycke
ATTORNEY

Aug. 18, 1925. 1,550,374
S. R. LINES
ELECTRICALLY ILLUMINATED SIGN
Filed Aug. 14, 1924  6 Sheets-Sheet 5
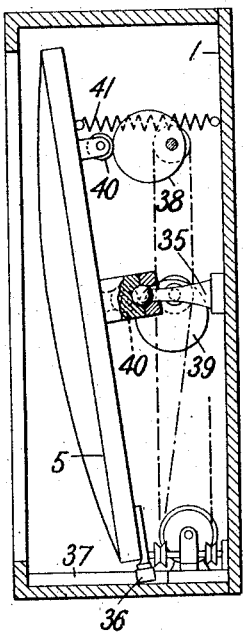
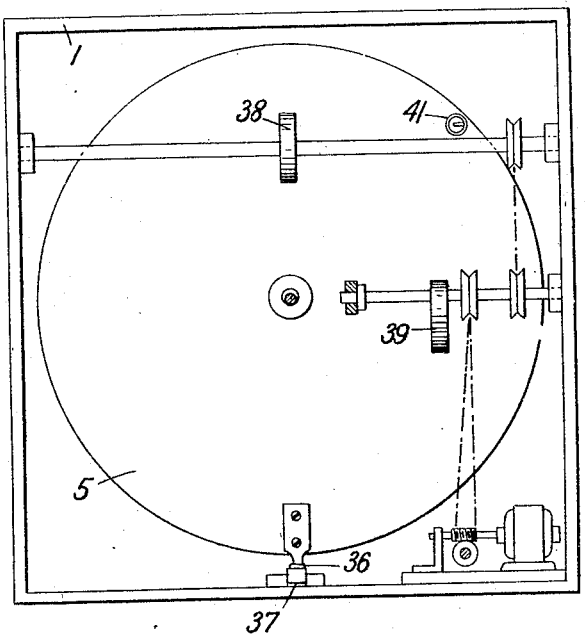
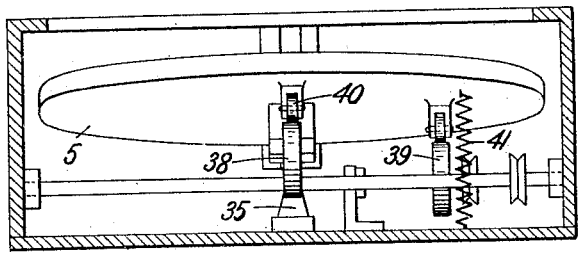
INVENTOR
Sydney Robert Lines
By Emil Bönnelycke
ATTORNEY Aug. 18, 1925.

S. R. LINES 1,550,374

ELECTRICALLY ILLUMINATED SIGN

Filed Aug. 14, 1924    6 Sheets-Sheet 6

INVENTOR
Sydney Robert Lines
By Emil Bönnelycke
ATTORNEY

Patented Aug. 18, 1925.

1,550,374

UNITED STATES PATENT OFFICE.

SYDNEY ROBERT LINES, OF STROOD, ENGLAND.

ELECTRICALLY-ILLUMINATED SIGN.

Application filed August 14, 1924. Serial No. 732,081.

*To all whom it may concern:*

Be it known that I, SYDNEY ROBERT LINES, a subject of the King of Great Britain and Ireland, residing at Strood, Kent, England, have invented a new and useful Electrically-Illuminated Sign, of which the following is a specification.

This invention has for its object an electric sign which produces to the eye the optical illusion of moving clouds of varying colour effects which may, for example, resemble the luminous effects produced by the variegated purple and azure colours of mother-of-pearl and may thus, if in the form of a disc, produce an effect which conveys the impression to the eye of a soap bubble.

This object may, according to the invention, be attained by projecting upon a translucent screen, through a projector consisting of an assemblage of lenses, prisms, or their equivalent the direct light rays from a continuously varying number of different coloured lights, appearing in ever-changing positions behind the screen and kept individually moving in and out of the focus of the projector while simultaneously rays from a reflector or reflectors which may remain stationary are projected on the screen.

By gradually moving the lamps or the projector out of focus, the projection of the light rays on the screen loses proportionately in intensity, so that while a lamp in focus produces a bright light on the screen, other lamps according to their distance from the projector throw a more or less dimmed light on the screen and the intermingling of the rays from different lamps and lenses produces different shades of colour and adds different degrees of dimness whereby a moving cloudy effect is produced.

If, in connection with a circular screen, the lamps in the centre are so arranged that they move only very slightly and remain practically in focus, the centre of the screen will permanently show a bright luminous effect; and if at the same time the backward and forward movement of the other lamps is so arranged that their travel increases proportionately with their distance from the centre, the light projected by the lamps into the proximity of the periphery of the screen will for the greater time be of the least intensity and thereby produce a kind of vanishing shading towards the edge which will give to the flat circular surface of the screen the appearance of a globular body.

An apparatus, according to the invention, comprises the following main components which are arranged one behind the other.

1. A flat screen which preferably consists of frosted or ground glass but may be of any other suitable translucent material or composition.

2. A projector in the form of a sheet of translucent glass comprising in its composition an infinite number of lens-like or prismatic deflecting or projecting elements such as may for instance be found in ornamental translucent glass panes imitating cut glass.

3. A lamp carrier carrying a multiplicity of electric lamps of various colours arranged on the flat, obtuse, conical or spherical surface of the carrier which may be highly polished to act as a reflector. Each lamp may, however, be provided with a separate reflector.

In order to bring the lamps gradually and individually in or out of focus, means are provided to impart to the lamp-carrier preferably a kind of slow jibbing motion which may be effected by rocking the said carrier simultaneously about two axes situated at right angles to each other in the plane of the carrier, which carrier has imparted to it the movements common to swash plates or wobbling discs.

A switch is provided which controls automatically the lighting of the lamps intermittently in groups and individually for varying periods, the lamps of each group being distributed over the lamp carrier so that a great variety of successive effects is produced on the screen. Assuming for instance that 60 lamps are mounted on the lamp carrier and a group of lamps comprises from 12 to 18 lamps, the switch may be adapted to operate well over a hundred different combinations.

The whole is arranged, including a motor and the necessary driving gear as well as a transformer (if such is required), in the form of a self-contained unit in a casing, whereby means are provided to adjust the distance between the screen and the projector to the focus of the latter.

The accompanying drawings illustrate by way of examples several constructions of signs embodying the invention.

Fig. 1 shows a sign in sectional elevation, while

Figure 1:
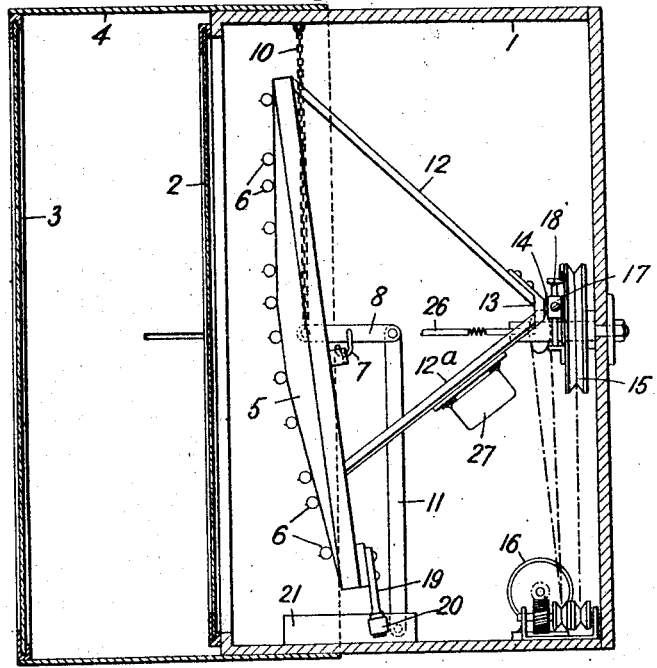
Figure 2:
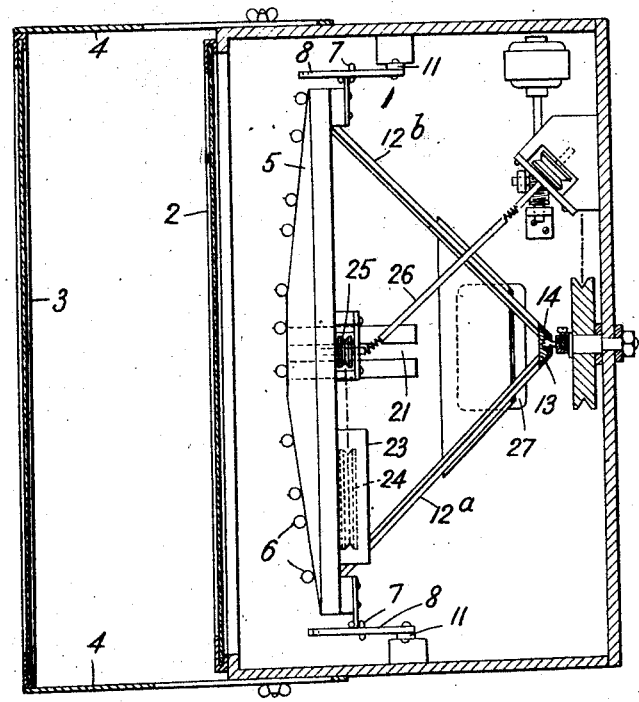
Fig. 2 is a sectional plan.
Figure 3:
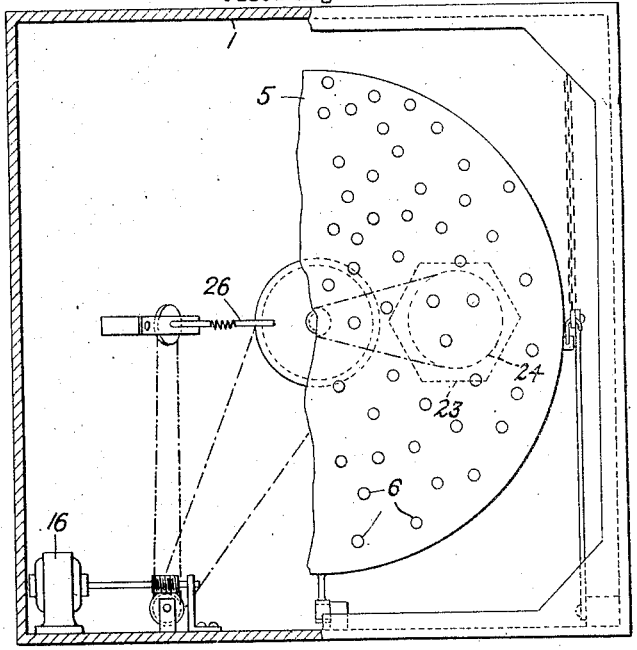
Figure 4:
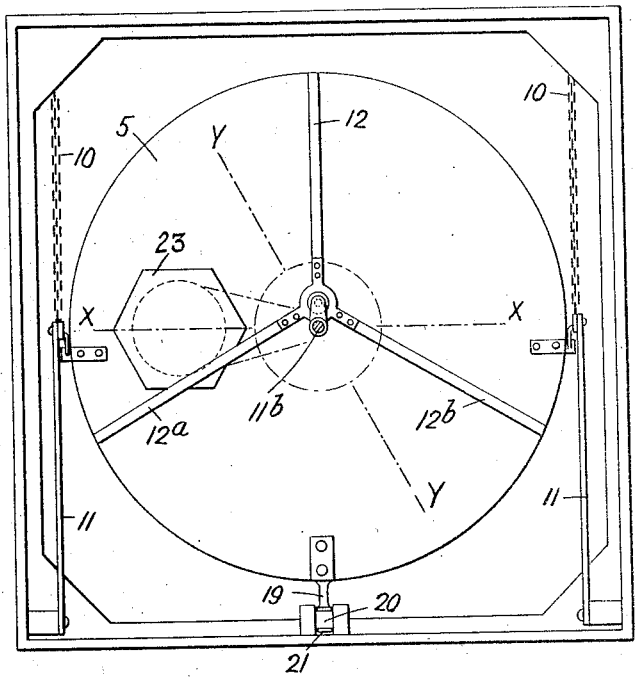

Fig. 3 a front elevation having part of the screen and of the projector broken away, and Fig. 4 a rear elevation of parts thereof.

Figure 5:
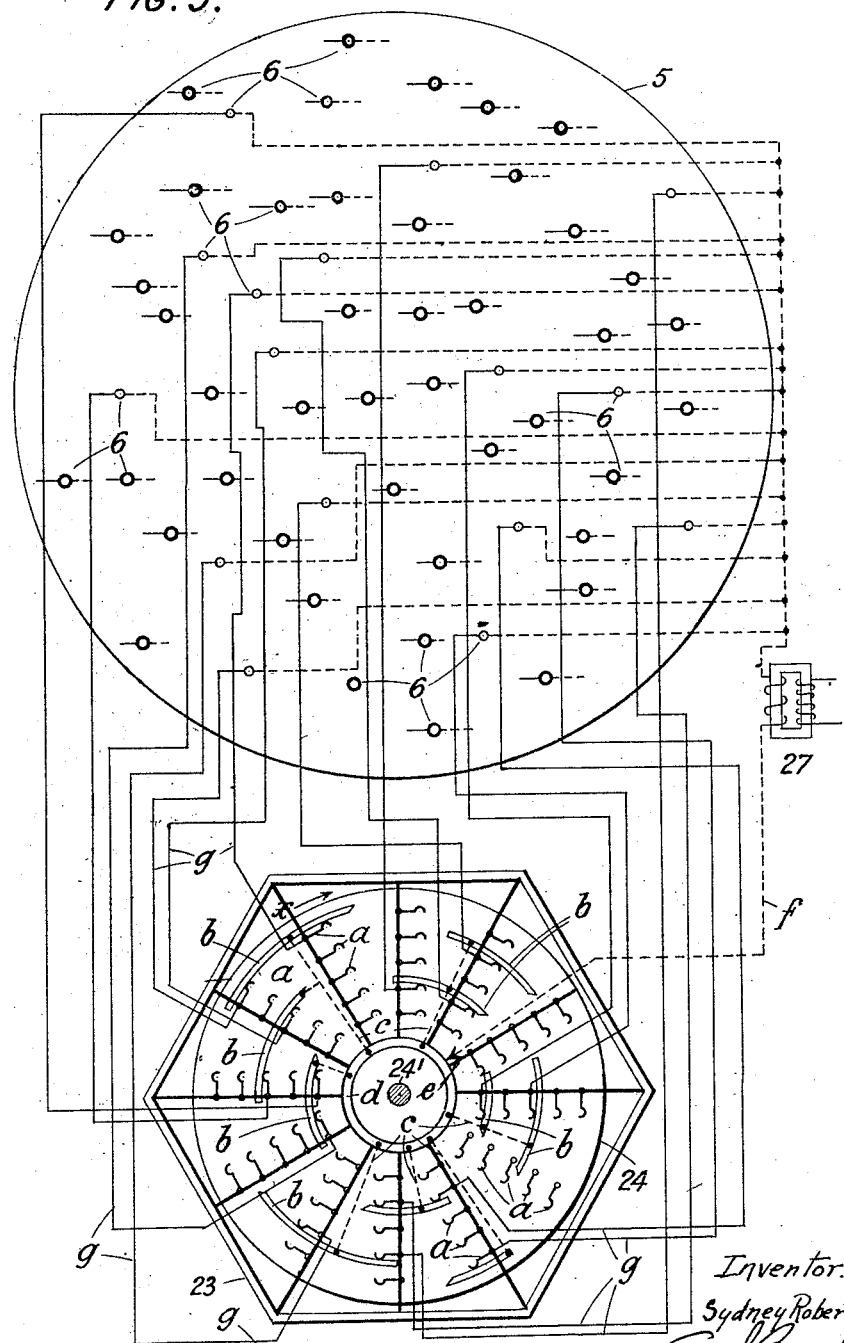

Fig. 5 shows diagrammatically an example of a switch and the manner of connecting the lamps in groups distributed over the lamp carrier, the latter being, for the sake of clearness, shown separated from the switch and, for the sake of space, on a scale rather less than one-half of that of said switch.

Figure 6:
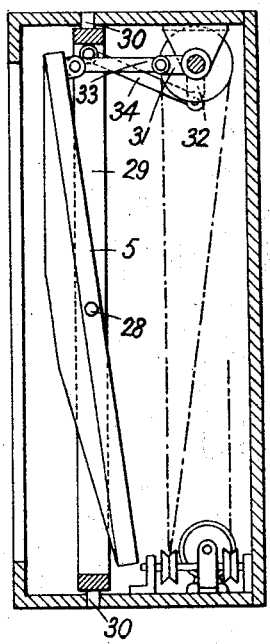
Figure 7:
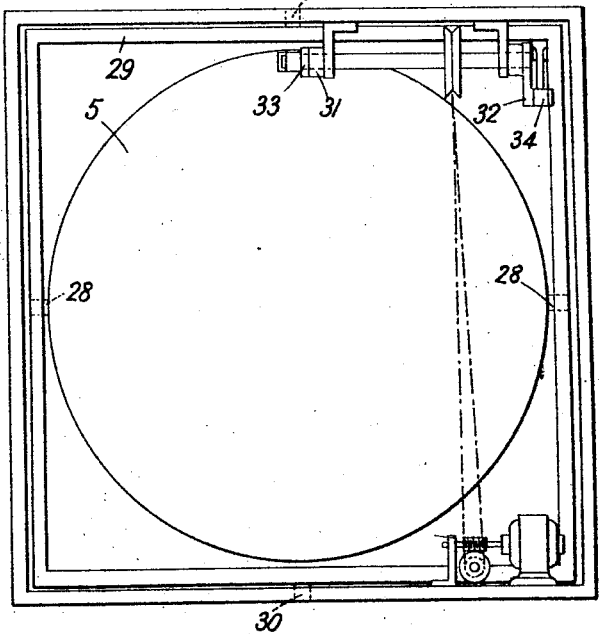

Figs. 6 and 7 show the working parts of a sign, in sectional elevation and in rear view, respectively, consisting in a mechanism of the gimbals type.

Figs. 8, 9 and 10 show, in sectional side elevation, rear view and plan, respectively, an alternative construction of the working parts, while.

Figure 11:
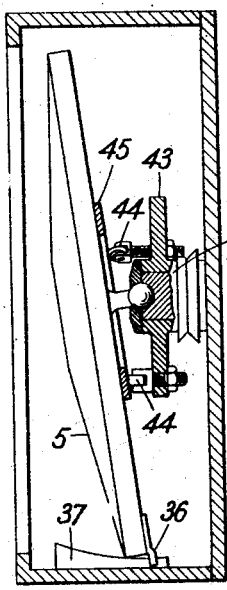
Figure 12:
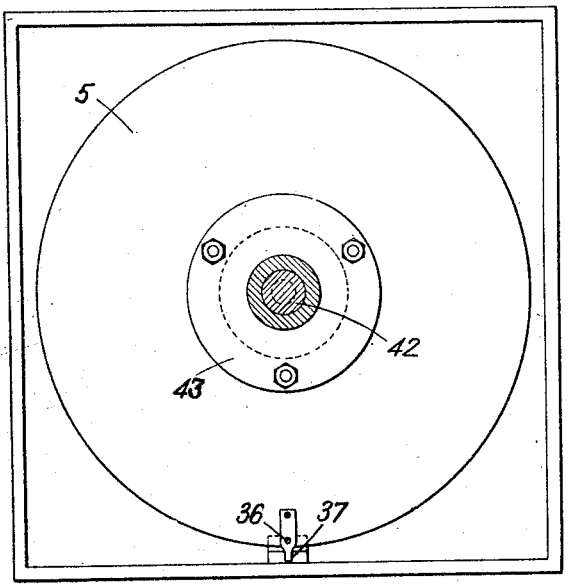
Figure 13:
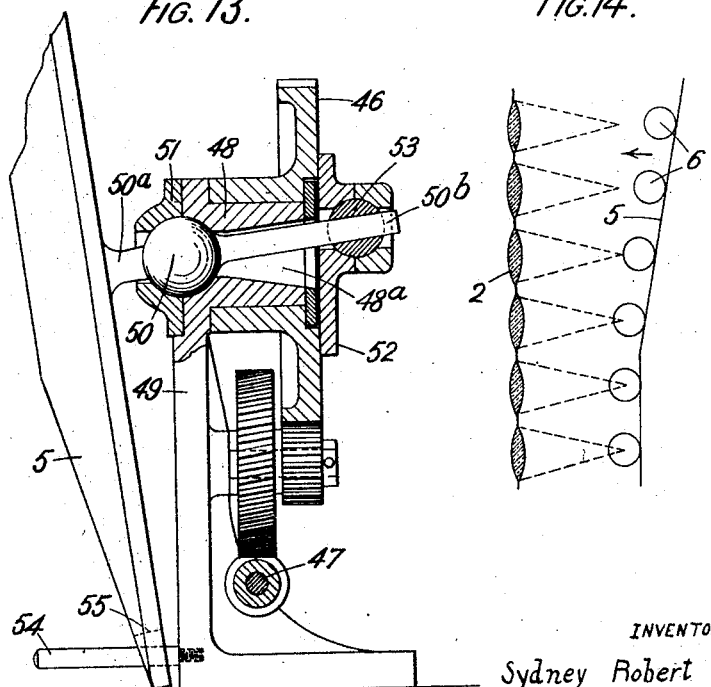

Figs. 11 and 12 are sectional side and rear views, respectively, of yet another construction, and Fig. 13 illustrates a lamp carrier operated by a directly driven gear.

Figure 14:
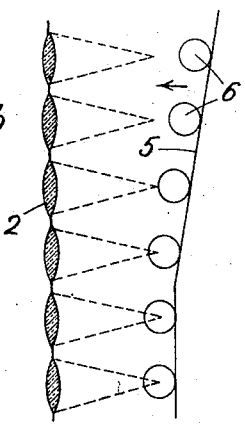

Fig. 14 is a diagram showing the variable focussing of the lamps with the projector.

The front of the casing 1 (Figs. 1-4) is formed by the projector 2 which may be removably arranged or be hinged thereto and which may take the form of an ornamental translucent glass plate comprising in its composition an infinite number of deflectors or projectors in the nature of lens-like or prismatic elements or both. A screen 3 is mounted in a frame 4 which is fitted to the front of the casing 1 in such a way that the distance between the screen and the projector may be adjusted. Behind the projector 2 is arranged the lamp carrier 5 which carries, distributed on its front, a multiplicity of incandescent electric lamps 6 and has the form of a truncated obtuse cone. It is so mounted in relation to the projector 2 that the filaments of the lamps located in or near the centre thereof are in focus with the projector 2. The lamp carrier 5 is, at opposite points of its horizontal diameter, supported by means of hooks 7 in bearings 8 which are capable of performing independently one from the other horizontally backward and forward movements. For this purpose the bearings 8 are formed as links which are suspended at one end by links or chains 10 from the top of the casing and supported at the other end by links 11 secured near the bottom of said casing.

The lamp carrier 5 is steadied by means of a finger 19 engaging, with a roller 20 mounted at its outer end, a groove 21 which is arranged near the bottom of the casing 1.

A tripod consisting of three angularly arranged stays or struts 12, 12$^a$ and 12$^b$, connected at equal distances near its circumference to the back of the lamp carrier 5, is formed at its apex, which is disposed co-axially with and in the rear of the lamp carrier with a seating 13 for a ball and socket connection with the crank pin 14 (Figs. 1 and 2) of the pulley 15, whose axis passes through the centre of the lamp carrier 5 and which is driven by a belt 55 and intermediate speed reducing gearing comprising the worm gear 56—57, the counter-shaft 58 and the belt pulley 59, from the electric motor 16 located in a convenient position in the casing 1. The eccentricity of the crank pin 14 is adjustable, being mounted on a slide 17 which is adapted to be radially displaced on the crank 18 secured to the pulley. If preferred, however, the crank-and-slide device 18, 17 may be replaced by a crank arm 11$^b$ (Fig. 4) of ordinary type which is mounted coaxially of pulley 15 to rotate therewith.

The crank 18 by means of the struts 12, 12$^a$, and 12$^b$, imparts to the lamp carrier a continuously rocking motion. Assuming (for the purposes of explanation only) that the crank pin 14 were in co-axial position with pulley 15, the rotation of the pulley would leave the lamp carrier unaffected. When now the crank pin 14, having been adjusted to the desired eccentricity (or the crank arm 11$^b$) is in a position, say for example, at a point vertically above the axis referred to (Figs. 1 and 4) the strut 12 will cause the lamp carrier 5 to rock on its horizontal diameter X—X (Fig. 4)—that is, about an axis which is at right angles to the radius of crank 18. Assuming further the crank pin to have reached by rotation a position in which its radius is in the axial plane of the strut 12$^a$, it will be this strut 12$^a$ which will cause the point in the circumference of the lamp carrier near which it is attached to be thrown forward, while the other two struts 12$^b$ and 12 will pull the opposite side of the lamp carrier inwardly, thereby rocking it about its diameter Y—Y (Fig. 4)—that is to say, about an axis which is at right angles to the radius of the crank. At any and every point in the circle of rotation of the crank pin a similar performance will be effected, thus causing the lamp carrier to perform the desired swash plate or wobbling movements, so that during a revolution of the crank every point of the periphery of the lamp carrier performs a slow reciprocating forward and backward movement. In this manner every radius of the lamp carrier is in turn brought into forward position, so that any lamps which may be located on the particular radius are brought into the focus of the projector 2, as shown for example in Fig. 1, while the lamps located in the opposite radius are out of focus, those nearest the periphery of the lamp carrier being farthest away from the focus as may be seen in the diagram—Fig. 14.

Each lamp is individually controlled by means of a make-and-break device arranged in its circuit. These make-and-break devices are united into a rotary multi-way switch 23 which is conveniently secured to the back of the lamp carrier.

Such a switch and its correlation to the lamps on the lamp carrier are diagrammatically illustrated in Fig. 5, that figure showing, however, only the electric circuits of the sixteen lamps which, in the momentary position illustrated, are temporarily closed at their respective make-and-break devices in the switch. It is to be observed that the switch 23 in Fig. 5 is shown on approximately double the scale as compared to the scale of the lamp carrier 5; and that for the purpose of more clearly illustrating the connection of the lamps with the switch, the latter is shown separated from the lamp carrier instead of in its correct relative position thereto, which correct position, however, is clearly indicated in Figs. 2, 3 and 4.

The switch comprises a disc member which is preferably constructed, as shown, in the form of a belt pulley 24 of insulating material and mounted on a shaft $24^1$ fitted eccentrically to the back of the lamp carrier 5. This disc or pulley 24 is driven (Figs. 1 to 4) from the countershaft 58 by means of a pulley 60 mounted thereon, a belt 61, and a pulley 62 mounted on one end of a flexible shaft 26, which latter is journalled at said end in the bracket 63 and supported at its other end in a bracket 64 (Fig. 2) fixed to the lamp carrier; the last-named end of shaft 26 carrying the belt pulley 25 which is co-axially arranged with the lamp carrier and is operatively connected with the pulley 24 by the belt 65.

Referring now to Fig. 5, the pulley 24 is provided on its rear face with a plurality of concentrically arranged segmental contact plates $b$ of varying angular extent. These plates $b$ are electrically connected by means of conductors $c$ to a collector ring $d$ in contact with a stationary contact $e$, through which it is supplied with current from the transformer 27 or other source of electricity by wire $f$. Each individual lamp 6 is electrically connected by a wire $g$ to a spring contact $a$, and these spring contacts are arranged in the casing of switch 23 in concentric series; the number of such series corresponding to the number of concentric circular paths followed by the rotating segmental contact plates $b$ so that the said contact plates $b$, in being rotated, successively close and open the individual lamp circuits at their respective spring contacts $a$.

It can clearly be seen from Fig. 5 that in rotating, say through an angle of 30°, some of the contact plates $b$ which are of greater angular length will maintain contact with the spring contacts $a$ for the duration of two periods of 30°; that is to say, the lamps controlled by such contact plates will be included in two groups of lamps, while lamps served by short contact plates will be extinguished and substituted by the lamps of another group.

The transformer 27 serves to reduce the high voltage required for the motor to a voltage suitable for the lamps, and it may be mounted on the struts, for example $12^a$, $12^b$, or in any other convenient position.

In the modification of the operating means of the lamp carrier 5 shown in Figs. 6 and 7, an arrangement of the gimbals type is made use of. The lamp carrier 5 is pivotally mounted by means of horizontally arranged trunnions 28 in a frame 29 which is pivoted on vertically arranged trunnions 30 in the casing 1. The lamp carrier 5 and the frame 29 are simultaneously rocked by means of the cranks 31 and 32 and the connecting rods 33 and 34 respectively, the cranks being arranged at an angle of 90°.

In Figs. 8, 9 and 10 a lamp carrier 5 with a spherical face is centrally mounted on the ball head of the bracket 35 and prevented from rotating by the finger 36 operating in the slot 37. The movements are imparted to the lamp carrier 5 by means of plate cams 38, 39 set at 90° to each other and operating upon followers 40 arranged at equal distances from the centre of the lamp carrier on radii at right angles to each other. A spring 41 is provided to hold the lamp carrier in contact with the cams. Instead of the spring each cam 38 and 39 may have arranged diametrically opposite to it another cam offset at 180°.

Figs. 11 and 12 show the lamp carrier 5 universally mounted in a bearing 42 which constitutes the stub shaft for a disc 43 on which are secured axially adjustable legs provided with castors 44 adapted to run on a ring 45 secured to the back of the lamp carrier. By adjustment of the length of the castor stems the rocking movements of the lamp carrier may be regulated.

Fig. 13 shows a direct geared lamp carrier. The hub of the spur wheel 46 driven by speed reducing gear from the motor shaft 47 is mounted on a boss 48 of the bracket 49. At its forward end the bracket 49 has formed in it a seating for the ball head 50 of a stud $50^a$ carrying the lamp carrier 5 and held by the cover 51.

Rearwardly the hub 48 is provided with a conical bore $48^a$ adapted to allow the stem 50ᵇ of the ball 50 to be freely moved therein by a crank 52 which is adjustably secured to the face of the spur wheel 46 and universally jointed to the stem 50ᵇ by means of the sliding ball 53. A steadying pin 54 mounted on the bracket engages a notch 55 arranged at the bottom centre of the lamp carrier.

While in the examples illustrated in the drawings, lamp carriers having a conical or a spherical face have been shown, it is understood that the lamp carrier may be in the form of a flat disc.

It is also understood that the movements described in relation to the lamp carrier may be imparted to the projector and the former remain stationary.

Further it is understood that the invention is not limited to a circular shaped screen, but any desired shape may be utilized.

Likewise other constructional modifications of the working mechanisms shall not be deemed to be a departure from the principle of the invention.

I claim:—

1. An electrically illuminated sign, comprising a translucent screen; a projector; a lamp carrier, said projector and lamp carrier constituting companion elements; a multiplicity of lamps of different colours distributed over the surface of the carrier; a switch automatically controlling the lighting of the lamps intermittently in groups and individually for varying periods; and means for imparting wabbling movements to one of said companion elements.

2. An electrically illuminated sign, comprising a translucent screen; a projector; a lamp carrier; a multiplicity of incandescent lamps of various colours distributed over the surface of the carrier; a switch automatically controlling the lighting of the lamps intermittently in groups and individually for varying periods; and means for imparting wabbling movements to the lamp carrier.

3. An electrically illuminated sign, comprising a translucent screen; a projector; a lamp carrier; a multiplicity of incandescent lamps of various colours distributed over the surface of the carrier; a switch automatically controlling the lighting of the lamps intermittently in groups and individually for varying periods; and means connected to move the lamp carrier in a manner to bring individual lamps in succession and periodically into or out of focus with the projector.

4. An electrically illuminated sign, comprising a translucent screen; a projector; a lamp carrier supported in yielding bearings; a multiplicity of lamps of different colours distributed over the surface of the carrier; a switch automatically controlling the lighting of the lamps intermittently in groups and individually for varying periods; and means for imparting wabbling movements to the lamp carrier.

5. An electrically illuminated sign, comprising a translucent screen; a projector; a lamp carrier supported by an axially-arranged ball-and-socket joint; a multiplicity of lamps of different colours distributed over the surface of the carrier; a switch automatically controlling the lighting of the lamps intermittently in groups and individually for varying periods; and means for imparting wabbling movements to the lamp carrier.

6. An electrically illuminated sign, comprising a translucent screen; a projector; a lamp carrier; a multiplicity of incandescent lamps of various colours distributed over the surface of the carrier; a switch automatically controlling the lighting of the lamps intermittently in groups and individually for varying periods; and means embodying a crank-operated tripod attached to the lamp carrier, for imparting to said carrier a rocking movement simultaneously about a vertical and a horizontal axis.

SYDNEY ROBERT LINES.